United States Patent [19]

Nakane et al.

[11] Patent Number: 4,494,188
[45] Date of Patent: Jan. 15, 1985

[54] METHOD OF PROCESSING AN OPERATING SYSTEM IN A MULTI-PROCESSOR SYSTEM

[75] Inventors: Keiichi Nakane, Kokubunji; Toshiro Kamiuchi, Kodaira; Hiroaki Nakanishi, Hitachi, all of Japan

[73] Assignee: Hitachi, Ltd., Tokyo, Japan

[21] Appl. No.: 365,312

[22] Filed: Apr. 5, 1982

[30] Foreign Application Priority Data

Apr. 3, 1981 [JP] Japan .................................. 56-49312

[51] Int. Cl.³ .......................... G06F 9/00; G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,110,822 | 8/1978 | Porter et al. | 364/200 |
| 4,124,890 | 11/1978 | Vasenkov et al. | 364/200 |
| 4,149,242 | 4/1979 | Pirz | 364/200 |
| 4,152,761 | 5/1979 | Louie | 364/200 |
| 4,156,910 | 5/1979 | Barton et al. | 364/200 |
| 4,229,790 | 10/1980 | Gilliland et al. | 364/200 |
| 4,253,148 | 2/1981 | Johnson et al. | 364/200 |
| 4,307,445 | 12/1981 | Tredennick et al. | 364/200 |
| 4,330,822 | 5/1982 | Dodson | 364/200 |
| 4,384,324 | 5/1983 | Kim et al. | 364/200 |

*Primary Examiner*—Jerry Smith
*Assistant Examiner*—Gary V. Hackcom
*Attorney, Agent, or Firm*—Antonelli, Terry & Wands

[57] ABSTRACT

An operating system (OS) is divided into units (OS processes) which are concurrently executable. When the processors concurrently request the execution of one OS process, data indicating that the requested OS process is in a ready state is loaded into a memory. The other processors repeatedly make an access to the data during the course of the execution of the user's task to check to see whether the ready-state OS process is present or not. A processor when detecting the ready-state OS process ceases the execution of the user's program and executes that OS process.

6 Claims, 13 Drawing Figures

METHOD OF PROCESSING AN OPERATING SYSTEM IN A MULTI-PROCESSOR SYSTEM

BACKGROUND OF THE INVENTION

The present invention relates to a processing method for an operating system (hereinafter abbreviated as OS) in a multi-processing system.

The multi-processing system is one of the systems for improving the performance and reliability of a single processor system. Various types of such systems have thus far been proposed. Great advances in recent semiconductor technology has provided cheap and high performance LSI processors, resulting in easier hardware design of the multi-processor system.

It is said that a multi-processor system with a combination of n processors can not produce an up-grade of the performance by n-times that of the single processor. In this regard, for example, the combination of three processors provides a performance improvement of approximately 2.1 times at most over the single processor system. The major causes for hindrance of the performance improvement are, for example, conflicts in access to the main storage used in common among the processors, the conflict control associated with common use of the resource, and an increase of the overhead arising from the communication among the processors. A more important cause is that, although the number of execution steps of the OS is larger than that of the execution steps of the user program in a real time system, the OS is sequentially processed by a single processor.

For example, in a single processor, when the execution of a user's program A terminates, the program A issues a request for exit processing, and the OS is processed in response to the request. Then, the OS performs exit processing to check for each resource as to whether there is present or not the shared resource under reserve as a result of execution of the user's program by the processor, as shown in FIG. 1. If a certain shared resource is under reservation, the OS liberates the resource 1 from its reservation (steps A1, B1, C1), while at the same time it liberates other user's programs which are posted for reservation of resource 2 at the steps (A2, B2, C2). Finally, the OS performs the exit processing for the user's program A (step ⓓ). The checks in these steps A1, B1, and C1 must be performed for all the idle or accessible resources. Further, although the processing steps A2, B2 and C2 following the checks are not dependent on the result of the checks, these checks and the succeeding processings are sequentially performed for the different resources. Further, a conflict control must be effected for the processing of the post for reservation of resource 1 (steps A2, B2, B2). For that reason, the exit processing by the OS consumes time.

When an input/output request to an input/output unit is issued from the user's program A being executed, the execution of the user's program A is interrupted, as shown in FIG. 2 and the OS is executed. The OS checks the reservation status of the I/O unit (step E1) and, if the I/O unit is idle or usable, it reserves the I/O unit (step E2) and arranges the control information for the I/O unit to activate the I/O unit (step ⓔ2). Then, the OS keeps the user's program out of its execution until the transfer of the I/O data is terminated (step ⓔ3). In this way, the input/output request is processed. Then, the OS finds a user's program of which the execution is requested (step ⓕ), and then starts the execution of the user's program B. When the I/O data transfer requested by the user's program A terminates during the course of executing the user's program B, an I/O transfer termination interrupt interrupts the execution of the user's program B, and the OS operates for processing the interrupt. Then, the OS liberates the reservation of the I/O unit (step ⓖ). and selectively activates an executable user's program (step ⓕ), and starts again executing the user's program. As described above, the user's program B is interrupted in its execution and postponed in the termination of its execution by processing the termination interrupt of the I/O transfer against the user's program A which is not related to the program B in its own program execution. This problem arises from the fact that when an OS processing request is issued from a certain processor, the processing is executed by only that processor.

SUMMARY OF THE INVENTION

Accordingly, an object of the present invention is to provide a processing method in which when an OS processing request is produced in a single processor in a multi-processor system, that request can be processed by any other processors.

To achieve the above object, in accordance with the present invention, the OS is divided into units (OS processes) which are concurrently executable. When the processors concurrently request the execution of one OS process, data indicating that the requested OS process is in a ready state is loaded into a memory. The other processors repeatedly make an access to the data during the course of the execution of the user's task to check as to whether the ready-state OS process is present or not. A processor when detecting the ready-state OS process ceases the execution of the user's program and executes that OS process.

DESCRIPTION OF THE PREFERRED EMBODIMENTS

Figure 3:
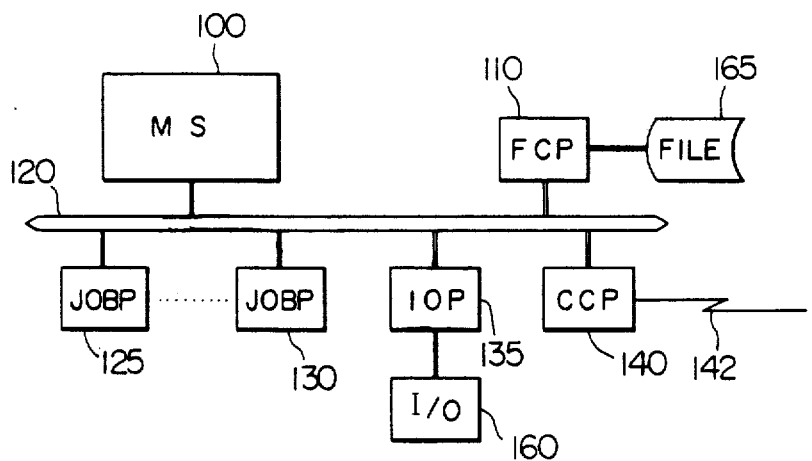
FIG. 3 shows a block diagram of a multi-processor subsystem to which the present invention is applied.

Referring to FIG. 3, there is shown a multi-processor system into which the present invention is incorporated. As shown, a main storage 100 and a plurality of processors 110, 125 to 130, 135, and 140, are connected to a high speed bus 120. The processor 135, as an input/output processor (IOP) connected to an input/output unit (hereinafter referred to as an I/O unit) 160, executes an OS for activating the I/O unit 160 and for processing an interrupt. The processor 110, as a file control processor (FCP) connected to a file unit 165 such as a disc device, executes an OS for operating on file data of the file unit 165, for activating the disc device and for processing an interrupt. The processor 140 is a communication control processor (CCP) which is connected to another system (not shown) through a communication line 142 and executes an OS for executing communication control with the system to which it is connected. As described above, those processors are for executing special OSs, and will frequently be called special purpose processors. The processors 125 to 130 are job processors (JOBP) for executing a user's program called a user task, and each execute the OS necessary for executing and supervising the user's task.

Figure 1:
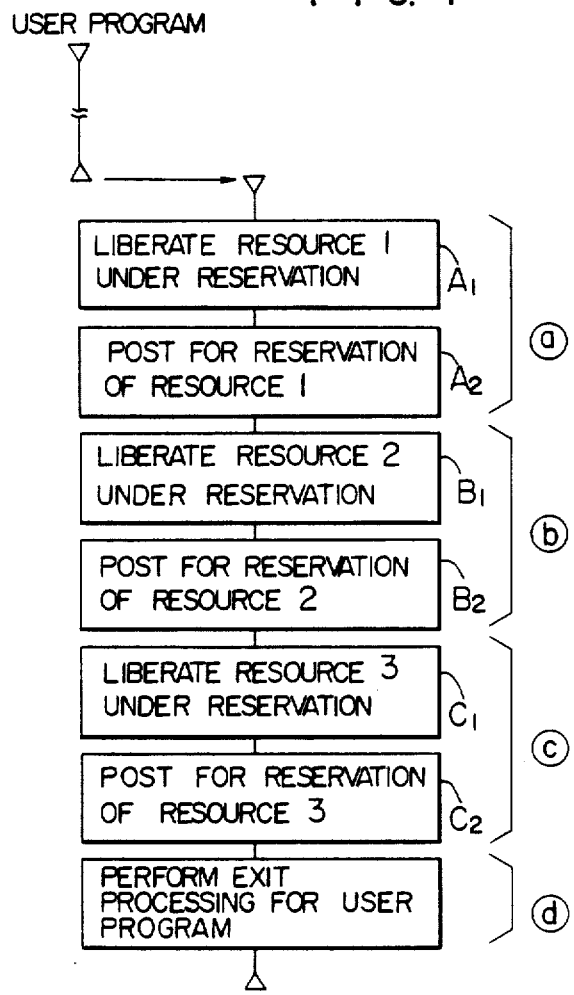
FIG. 1 illustrates a flow chart of the prior OS for the exit processing of a user's program.

It frequently happens that the processing of a part of the OS is executed concurrently with the processing of other parts of the OS. For that reason, the OS is divided into concurrently executable units (called OS processes). For example, the OS for executing the exit processing shown in FIG. 1 is divided into an OS process for executing the steps ⓐ and ⓓ and an OS process for executing the steps ⓑ and ⓒ. A part of the program for executing the steps ⓔ₂, ⓕ, ⓖ, and h is treated as a single OS process. The combination of the steps ⓔ₁ and ⓔ₃ is similarly treated as a single OS process. A request of processing an OS, given by the user's task or the I/O unit, designates an OS number of the OS process to be executed. Some OS processes are executed by any one of a plurality of processors, and some other ones by only the special purpose processors.

For example, the OS process necessary for controlling the execution of the user's task may be executed by any of the JOBPs 125 to 130. The OS process executed by the special purpose processor such as IOP 135 can be executed by only the corresponding special purpose processor. As previously stated, the present invention enables the OS processors to be concurrently executed by making use of the fact that a part of the OS process can be executed by any one of the plurality of the processors. Accordingly, it is preferable that each special purpose processor can execute a part of each OS process executable by the JOBPs 125 to 130.

Figure 2:
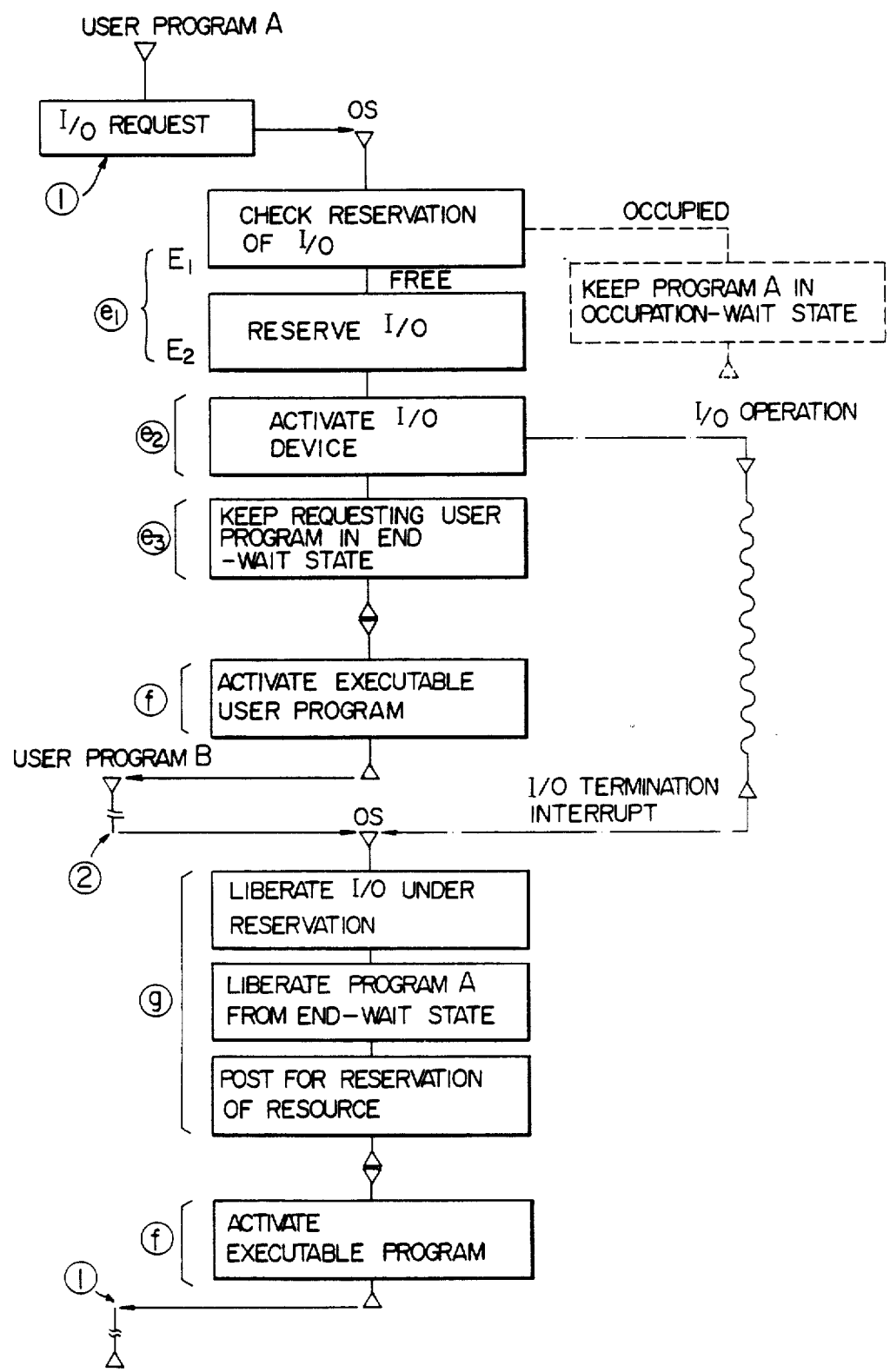
FIG. 2 illustrates a flow chart of the prior OS for processing an input/output request.

The OS process for the steps ⓐ to ⓓ in FIG. 1 is executable by any of the JOBs 125 to 130 in the present invention. This is correspondingly applied for the OS process for the combination of the steps ⓔ₁ and ⓔ₃ and the step ⓕ shown in FIG. 2. The OS process for the steps ⓔ₂ and ⓖ is performed by only the special purpose processor such as IOP 135. The steps ⓔ₂ and ⓖ shown in FIG. 2 are executed by the JOBP for executing the step ⓔ₁ and the like in the past. In the present invention, the OS process for these steps is executed by the IOP 135 or the like. Therefore, there is no need for the execution of these OS processes, with the result that the execution of the user's program can be speeded up to such an extent.

In the present embodiment, the OS processes whch can be executed by any one of the JOBPs 125 to 130 may be designated for execution, if necessary. Predetermined priority levels are respectively allotted to the OS processes depending on the contents to be processed. The execution of the OS process is carried out in accordance with an order of the priority levels.

Figure 4:
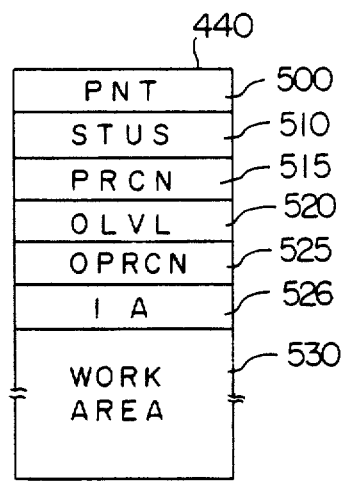
FIG. 4 shows an OS process control block (OSPCB) 440 for supervising an attribute and a state of the OP process.

Turning now to FIG. 4, there is shown an OS process control block (OSPCB) 440 for supervising an attribute and a state of the OS process. The OSPCBs 440 are provided in the main storage 100, one for each of the OS processes. The execution of the OS processes is performed on the basis of the OSPCB information. The OSPCB 440 is comprised of an address pointer (PNT) 500 for designating the top address of the succeeding OSPCB in forming a ready queue of the OS processes, a status (STUS) 510 for indicating a present state of the OS process such as a ready state and a run state, a processor number (PRCN) 515 for the OS process to be executed, a priority level (OLVL) 520 of an OS process which is set at the stage of designing the system, a processor number (OPRCN) 525 of a processor for executing the OS process when that processor number is previously determined at the stage of the system design, a top address (IA) 526 of the OS process corresponding to the OSPCB in the main storage, and a work area 530 for storing the remaining information necessary for the control of the OS process. When the processor for executing the OS process is not determined at the stage of the system design, OPRCN 525 in OCPCB 440 for the OS process is zero. Numbers, which do not include zero but are classified into a number for designating the kind of the processors such as JOBP, FCP, etc. and a sub-number for designating a specific kind of processor of those processors, are applied to the processors in the multiprocessor system shown in FIG. 3, respectively.

Figure 5:
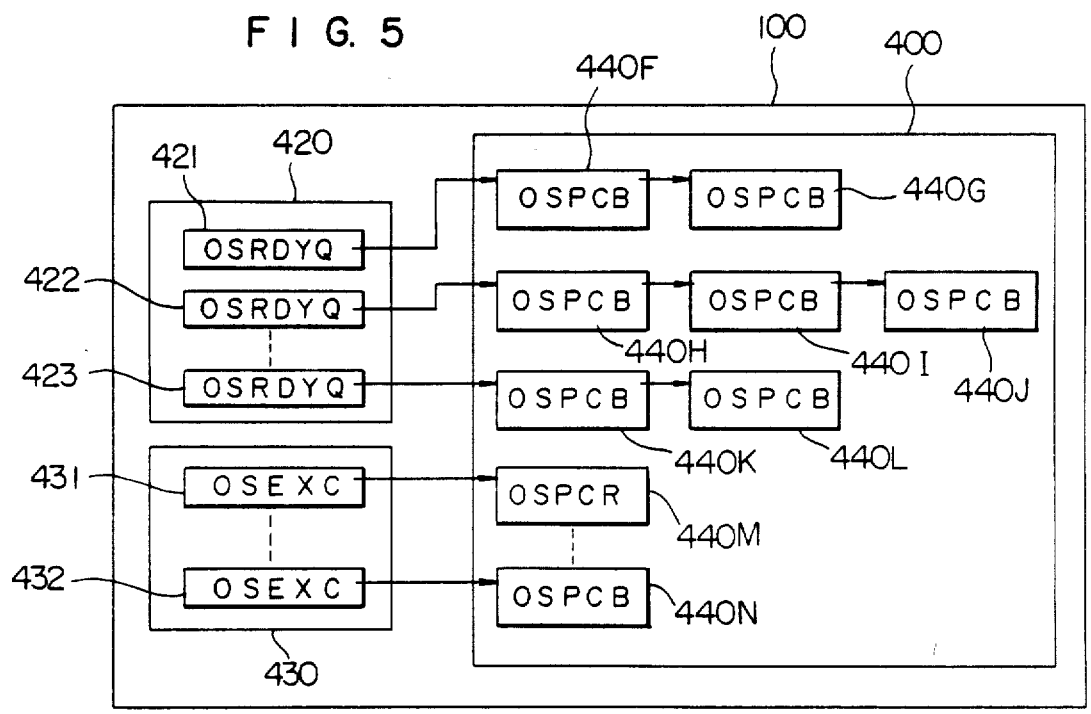
FIG. 5 illustrates a queue for controlling the execution of the OS process.

FIG. 5 shows various kinds of control blocks for controlling the execution of the OS process, and OSPCB 440 connected to these blocks. Those control blocks are all arranged in the order of the OS process number in a predetermined memory area of the main storage 100. Each OSPCB 440 in the OSPCB group 400 is coupled with one of the following wait states, depending on a state of the corresponding OS process. The OSPCB 440 for the OS process which is not being executed or to which the request of execution is not issued, is never coupled with the wait states. Pointers OSRDYQ 421 to 423 in a pointer group 420 are provided one for one kind of the processors. For example, OSRDYQ 421 is provided for JOBPs 125 to 130; OSRDYQ 422 for IOP 135; OSRDYQ 423 for FCP 110. When a certain OS process is in a ready state or in an idle processor hunting state, OSPCB 440 of the OS process is coupled with one of the OSRDYQs 421 to 423, which corresponds to the kind of the processor for executing the OS process, in the order from high to low priority levels. In the example of FIG. 5, OSPCBs 440F and 440G for the OS processes F and G are connected to OSRDYQ 421 for hunting an idle state of any one of JOBPs 125 to 130; OSPCBs 440H to 440J for the OS processes H to J are connected to OSRDYQ 422 for hunting an idle state of IOP 135; OSPCBs 440K and 440L for the OS processes K and L are connected to OSRDYQ 423 for hunting an idle state of FCP 110. A pointer group 430 is made up of pointers (OSEXC) 431 to 432 provided for the processors. OSPCBs 440M to 440N of the OS processes, for example, of those OS processes under execution in the processors are connected to one of OSEXCs 431 to 432, whch correspond to the processor currently executing the OS process. The connection of OSRDYQ 421 to 423, and OSEXC 431 to 432 with OSPCB 440, and the interconnection among OSPCBs 440 are realized by setting an address of the designated OSPCB 440 in the pointer. For example, the top address of the OSPCB 440 at the highest priority level in the OS process and in a ready state in JOBP is stored in OSRDYQ 421. The top address of OSPCB 440 in a ready state and at the next priority level in JOBP is stored in PNT 500 of OSPCB 440. An arrow head in FIG. 5 indicates an address pointed to by each pointer.

Figure 6:
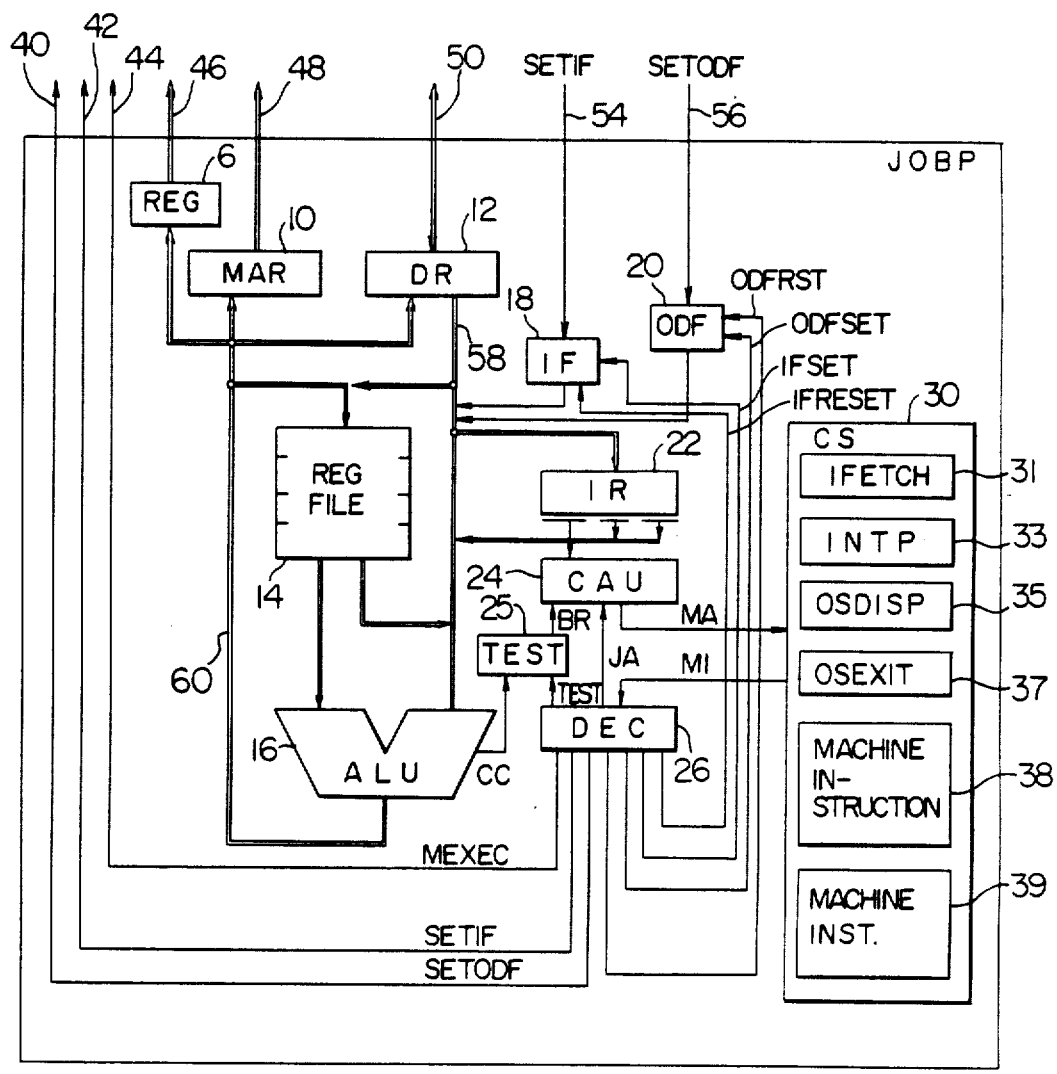
FIG. 6 is a block diagram of a job processor according to the present invention.
Figure 7:
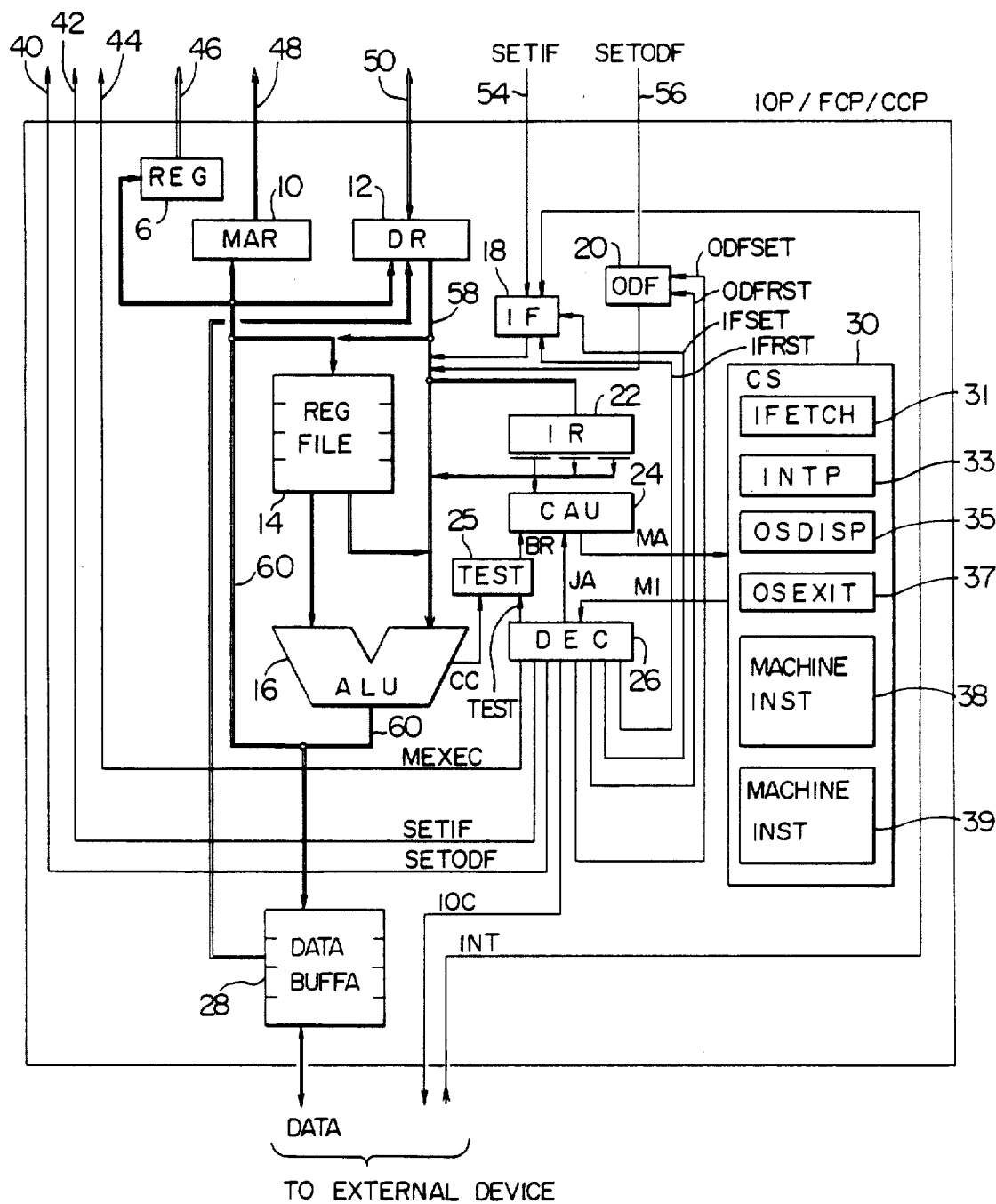
FIG. 7 is a block diagram of a special purpose processor according to the present invention.

FIGS. 6 and 7 show the circuitries of JOBP and the special purpose processor which are essential to the present invention, respectively. The major difference between the special purpose processor and the JOBP resides in that the special purpose processor is connected to an external device such as the I/O device 160 or the file 165, through a data buffer 28. The external devices connected to and controlled by FCP 110, CCP 140 and IOP 135 are different from one another. For that reason, these processors have specially designed circuits for controlling their associated external devices. Those circuits are not essential to the present invention and hence no further explanation of them will be made. The processors have known interface circuits connected to the bus 120. These processors are under control of a microprogram stored in a control storage (CS) 30. Programs in the microprogram common to all the processors are: an instruction fetch control microprogram (IFETCH) 31, an interrupt process microprogram (INTP) 33, an OS dispatch control microprogram (OS-DISP) 35, an OS process termination control microprogram (OSEXIT) 37, and a microprogram 38 for executing a machine instruction OSQUE for the request of executing the OS process used in the present invention. These microprograms are provided according to the present invention. JOBP and the special purpose processor each have a microprogram 39 for controlling the execution of various machine instructions required, in addition to the above mentioned programs. Since the kind of the machine instructions required for JOBP is different from that of those for the special purpose processor, the microprogram 39 of JOBP in fact is different from that of the special purpose processor. The difference between the microprograms 39 provides no problem in the present invention, and hence like reference numeral 39 is used for designating the microprograms.

Each processor has a circuit (not shown) containing a program counter for sequentially reading out the machine instructions from the main storage 100. The instruction read out by the circuit under control of the program IFETCH is set in an instruction register 22, through a line 50, a data register 12 and a line 58.

An address generator circuit (CAU) 24 generates a microinstruction address MA which is applied to CS 30; and, when a machine instruction is newly set in the instruction register 22, produces the top address of the microprogram to be read out by an OP code of the instruction, and sequentially up-dates the output address MA. When receiving a branch signal BR from a test circuit 25, the processor produces a jump address JA applied from a decoder 26. The decoder 26 decodes a microinstruction MI read out from CS 30 to provide various kinds of control signals. The control signals are: a signal MEXEC for directing an activation of the main storage, a signal SETIF for setting an interrupt flag IF 18 of another processor, signals IFSET and IFREST for setting and resetting IF 18 of its processor, a signal SETODF for setting an OS process dispatch flag OSF 20 of another processor, signals ODFSET and ODFRST for setting and resetting ODF 20 of its processor, a test condition signal TEST, and other control signals (not shown). The other control signals are: a signal for controlling the arithmetic operation of an arithmetic and logic unit ALU 16, a signal for designating a desired register in a register file 14, a set signal for registers 6, 10, 12 and 22, signals (not shown) for controlling transfer of data from a register 12, 1F 18, ODF 20, and IR 22 to the line 58. In the special purpose processor, the decoder 26 produces special control signals such as a control signal (not shown) for the data buffer 28, in addition to a control signal IOC to the external device. Accordingly, the circuit construction of the decoder 26 in the JOBP is different from that of the decoder in the special purpose processor. Nevertheless, like reference numeral 26 is applied for the decoders of both processors, for simplicity of explanation.

The register file 14 previously stores data to calculate addresses of the data shown in FIG. 5 or the addresses of the areas in OSPCBs shown in FIG. 4. The register file 14 is also used for testing the interim result of the arithmetic operation.

The arithmetic and logic unit ALU 16 executes the arithmetic operation designated by a signal from the decoder 26 and produces a condition code CC given depending on the operation result, for example, positive, negative or zero of the operation result.

The test circuit 25 produces a branch signal BR when the condition code CC satisfies a condition designated by a test condition signal TEST derived from the decoder 26. The test condition signal TEST includes signals for designating positive, negative or zero. When a microinstruction address must be jumped on the basis of the judgement of the operation result or at the time of a conditional branch, the decoder 26 selectively produces one of these three test condition designating signals on the basis of the judgement. On the other hand, when the microinstruction is jumped independent of the operation result or at the time of an unconditional jump, the decoder 26 produces simultaneously condition designating signals. At that time, the test circuit 25 produces a branch signal BR independent on the condition code CC.

The control of executing the OS process will be described in detail.

(1) Request of executing an OS process

The request of OS process execution may be produced from either of the user's task or the OS process. For that reason, the user's task and the OS process each contain a special machine instruction for requesting the execution of the OS process OSQUE.

Assume now that an instruction OSQUE is set in the instruction register 22 in a certain processor. The instruction OSQUE is made up of an operation code field for direction of the OS process execution, an OS process number field, and a processor number field. When the instruction OSQUE is set in the instruction register 22, the microprogram 38 (OSQUE routine) for executing the instruction is sequentially read out into the decoder 26.

The operation under the OSQUE routine will be described with reference to FIG. 8. Check is first made as to whether a processor for executing an OS process designated by the instruction OSQUE is designated or not at the state of the system design. if the OS process is to be executed by a specific processor, the number of the specific processor is set in OPRCN 525 in OSPCB 440 when it is designed. If not so done, all 0's are set in OPRCN 252.

The check is performed following the procedural steps given below. A given register in the register file 14 previously stores the top address of the storing area 400 of OSPCB in the main storage 100, the size of each OSPCB, and the address difference from the top address of each OSPCB to the OPRCN area. On the basis of this data and the OS processor number in the instruction register 22, ALU 16 calculates an address of the OPRCN area in OSPCB for the OS process having its process number designated by the instruction OSQUE, under control of a plurality of microinstructions. The calculated address is transferred to the main storage memory 100, through the line 60, MAR 10 and the line 48. The signal MEXEC, together with the address, is transferred from the decoder 26 to the main storage 100 via the line 44. The data read out from the main storage 100 in response to the address is inputted to ALU 16, via the line 50, the data register 12, and the line 58. ALU 16 judges as to whether the data is all 0's or not under control of the microinstruction. When the data is not all 0's, it produces "1" as the condition code CC. When the decoder 26 decodes a microinstruction for controlling the judgement of the code CC, it transfers a signal TEST for directing a positive value judgement to the test circuit 25 and produces a jump address JA for transmission to the address generator circuit 24. The test circuit 25 produces a signal BR. The address generator circuit 24 responds to the signal BR to produce the jump address JA for transfer to CS 30. The jump address is the address of the microinstruction for executing the next step 625.

When OPRCN 525 is all 0's, the address generator circuit 25 increments by one (+1) the output address and then a microinstruction to check as to whether or not the executing processor is designated by the instruction OSQUE.

The check is executed in ALU 16 and if the field is not all 0's, it is jumped to a microinstruction for executing the step 625, as in the above-mentioned procedure. If the field is all 0's, a microprogram for executing the next step 610 is executed.

The step 605 is executed in this way.

Thus, the control of the conditional branch is determined by the signal CC derived from ALU 16, the test designating signal TEST produced from the decoder 26, and the jump address JA. Such an address control is performed similarly in the following processing.

A step 610 is performed when the executing processor is not designated. At the first step, one of the OSRDYQs 421 to 423 in the pointer group 420 in the OS process execution ready queue is read out by the kind designation code contained in the own processor number previously stored in the register file 14. As previously stated, OSRDYQs 421 to 423 are provided each for each kind of the processor. If the processors now executing the instruction OSQUE are JOBPs 125 to 130, OSRDYQ 421 for JOBP is read out.

An address of OSRDYQ 421 is calculated in ALU 16 by using the top address of the pointer group 420 previously stored in the register file 14 and the kind designation code in the own processor number. It is checked whether or not OSRDYQ 421 is read out to ALU 16 by the address calculated. If OSRDYQ 421 is all 0's, it is judged that there is no ready state OS process, and an address of OSPCB 440 in the instruction OSQUE corresponding to the OS process number is calculated by ALU 16 and set in OSRDYQ 421. Conversely, if OSRDYQ 421 does not have all 0's, OLVL 520 in OSPCB 440 (hereinafter referred to as a first OSPCB) designated by this value is read out into ALU 16. Then, OLVL 520 in OSPCB (hereinafter referred to as a designated OSPCB) corresponding to the OS process number designated by the instruction OSQUE is read out into ALU 16. The read address of OLVL 520 is obtained by adding to the address of OSPCB to which the read address belongs a difference between its address and the address of an OLVL area. The difference is previously stored in the register file 14. The priority levels of the OS processes are previously stored in OLVL 520 in each OSPCB 440. ALU 16 compares the value of OLVL 520 in the designated OSPCB 440 with the value of OLVL 520 in the first OSPCB 440. If the former is larger than or equal to the latter, the next OSPCB 440 (hereinafter referred to as a second OSPCB) designated by the value of the pointer (PNT) 500 in the first OSPCB 440 is read out. When the value of OLVL 520 of the second OSPCB 440 is larger than or equal to the value of OLVL 520 in the second OSPCB 440, the next OSPCB 440 designated by the pointer (PNT) 500 in the second OSPCB 440 is read out. This process is repeated until the value of the pointer (PNT) 500 in OSPCB 440 in a ready queue is all 0's or smaller than the value of OLVL 520 in the designated OSPCB 440.

When OSPCB 440 of which the pointer (PNT) 500 has all 0's is found, an address value of the designated OSPCB 440 is set in the pointer 500 (PNT) of the OSPCB 440.

When OSPCB 440 of which OLVL 520 has a value smaller than that of OLVL 520 of th designated OSPCB 440 is found, the address of the designated OSPCB 440 is set in the pointer coupled with OSPCB 440 preceeding the found OSPCB 440 [the pointer (PNT) 500 in OSPCB 440 or OSRDYQ 421]. The address of the found OSPCB 440 is set in the pointer (PNT) 500 of the designated OSPCB 440.

In this way, OSPCBs of the requested OS process can be coupled with OSRDYQ which is used by the same kind of the processors as that of the own processors in the order from high to low priority levels (step 610).

At that time, a ready state flag is set in STUS 510 in OSPCB 440 newly connected.

Whether or not there is a processor not executing the OS process in the same kind of the processors is checked by an OSEXC 430 provided for each processor (step 615). More specifically, OSEXC corresponding to the processor number with the same kind designating code as that of the own processor is selected from OSEXCs 431 to 432 in the run state OS process pointer group. It is checked whether or not an OSEXC having the pointer value of all 0's is contained in the selected ones (615). The address of the OSEXC to be selected is calculated in ALU 16 on the basis of the top address of the pointer group 430 previously stored in the register file, the kind designation code in the processor number of the own processor, and the total number of the processors for each kind of the processors. If the result of the check is NO, all of the processors are in a run state, the program execution is jumped to a program IFETCH to be described later.

If there is contained an OSEXC having the pointer value of all 0's in those selected ones, it is further checked to see whether or not these ones with all 0's contain the OSEXC corresponding to the own processor (616). If YES, the decoder 26 produces a signal ODFSET to set ODF 20 of the own processor, that is, the own processor sends a dispatch request of the OS process to the processor itself (step 620) and jumps to the program IFETCH. If NO, one OSEXC is selected from those selected having all 0's in the pointer value. For example, the selected OSEXC is the one relating to the processor with the smallest processor number. The own processor delivers an OS dispatch request to the processor corresponding to the selected OSEXC through the high speed bus 120. In particular, the processor number of the processor for the OSEXC selected is read out from the register file 14 to transfer it through the register 6 and the line 46 to the bus 120, and at the same time transfer a signal SETODF from the decoder 26 to the bus 120 via the line 40. Then, the jump is made to the program IFETCH. The interface circuit (not shown) of each processor, when the processor number on the bus is that of the own processor, fetches the signal SETODF and transfers it onto the line 56. As a result, in the processor designated by that number, ODF 20 is set (step 640).

When the executing processor is designated, one of OSRDYQs 421 to 423 in the OS process ready queue pointer group corresponding to the processor kind determined by the kind designation code contained in the processor number of the processor designated is selected, and OSPCB 440 corresponding to the instruction OSQUE is chained in the chain of OSRDYQ with the head of the selected OSRDYQ, as in the process 610. In other words, the OSPCB 440 corresponding to the OS process under the execution request is coupled with the OSRDYQ used in common by the processors of the designated kind in the order from high to low priority levels (625). A ready state flag is set in STUS 510 of OSPCB 440 corresponding to the instruction OSQUE. Further, the processor number of the execution designated processor is set in PRCN 515 of OSPCB 440. The processor number is the processor number designated by the instruction OSQUE or the processor number of the processor in which the instruction OSQUE is set in OPRCN 525 in OSPCB 440 corresponding to the OS process number of OSQUE. In the event that an executing processor is designated by the instruction OSQUE, and an executing processor is designated by OPRCN 525 of OSPCB 440 corresponding to the OS process designated by the instruction OSQUE is designated, and these designated executing processors are different from each other, the executing processor number of the processor designated by OPRCN 525 is set in PRCN 515 with a higher priority (630).

Then, it is checked whether or not the processor number set in PRCN 515 corresponds to that of the own processor (635).

If YES, the own OSEXC in the run state OS processor pointer group 430 is further checked (618). When the own processor is executing the OS process, nothing is executed and the program execution jumps to the execution of the next IFETCH. When it is judged that the own processor is not executing the OS process, the process step 620 is executed.

If the processor number of PRCN 515 is not that of the own processor, OSEXC corresponding to the processor number in the run state OS process pointer group 430 is checked (step 638). When the processor with that number is executing the OS process, nothing is executed and the program execution is jumped to the execution of IFETCH. When the processor bearing that number is not executing the same, it sends the OS process dispatch request to the processor, as in the process step 620 (step 640).

In this way, the execution of the instruction OSQUE is performed and upon the completion of the execution, the program execution is jumped to IFETCH.

(2) IFETCH routine

Figure 9:
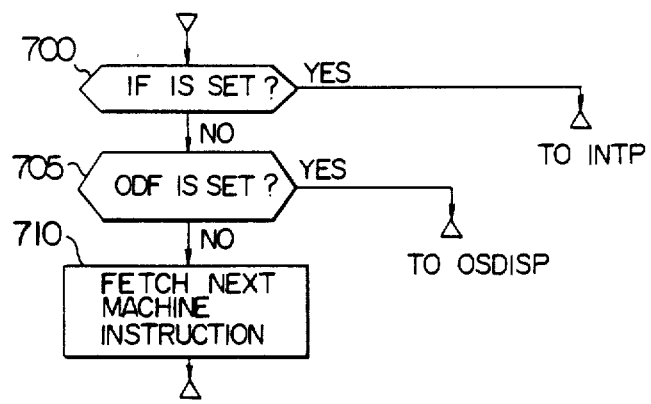
FIG. 9 shows a flow chart illustrating an instruction fetch routine (IFETCH).

This routine is executed every time the execution of each machine instruction is finished. A processing flow of the IFETCH routine is shown in FIG. 9.

Firstly, the own IF is checked and it is also checked whether an interrupt request is set or not (step 700). If YES, an ordinary interrupt processing microprogram INTP is executed. If NO, the own ODF 20 is checked to find whether or not there is an OS process dispatch request (step 705). If the dispatch request is present, a jump is made to an OS process dispatch control program OSDISP of which the processing will be described in detail later. If the dispatch request is absent, the next machine instruction of the user's program thus far executed or of the OS process is read out from the main storage 100 and the read instruction is decoded (step 750). In this way, the IFETCH routine is executed and completed. When the step 710 is executed, the microprogram 39 is executed for executing the machine instruction read out. Note here that the IFETCH routine is executed every execution of one machine instruction, irrespective of the type of the program under execution, the user's program or the OS process. ODF 20 of the processor executing the OS program is not set, as described above. Accordingly, this processor never executes the OSDISP routine. It is set by the decoder within the processor and is set by the signal SETIF from the other processor through the line 54. Further, IF 18 of the special purpose processor is set by the interrupt signal INT from the external device. The interrupt signal INT is inputted at the time of the termination of the operation of the I/O device. Since it is known that the interrupt processing is executed when the interrupt is detected by the step 700, no further explanation will be made. Only the related OS process will be given. The INTP routine is executed to request the execution of an OS process for analyzing a factor causing the interrupt. When the execution of the analyzing OS process terminates, an OS process determined on the basis of the interrupt factor is executed.

(3) OS process dispatch (OSDISP)

Figure 8:
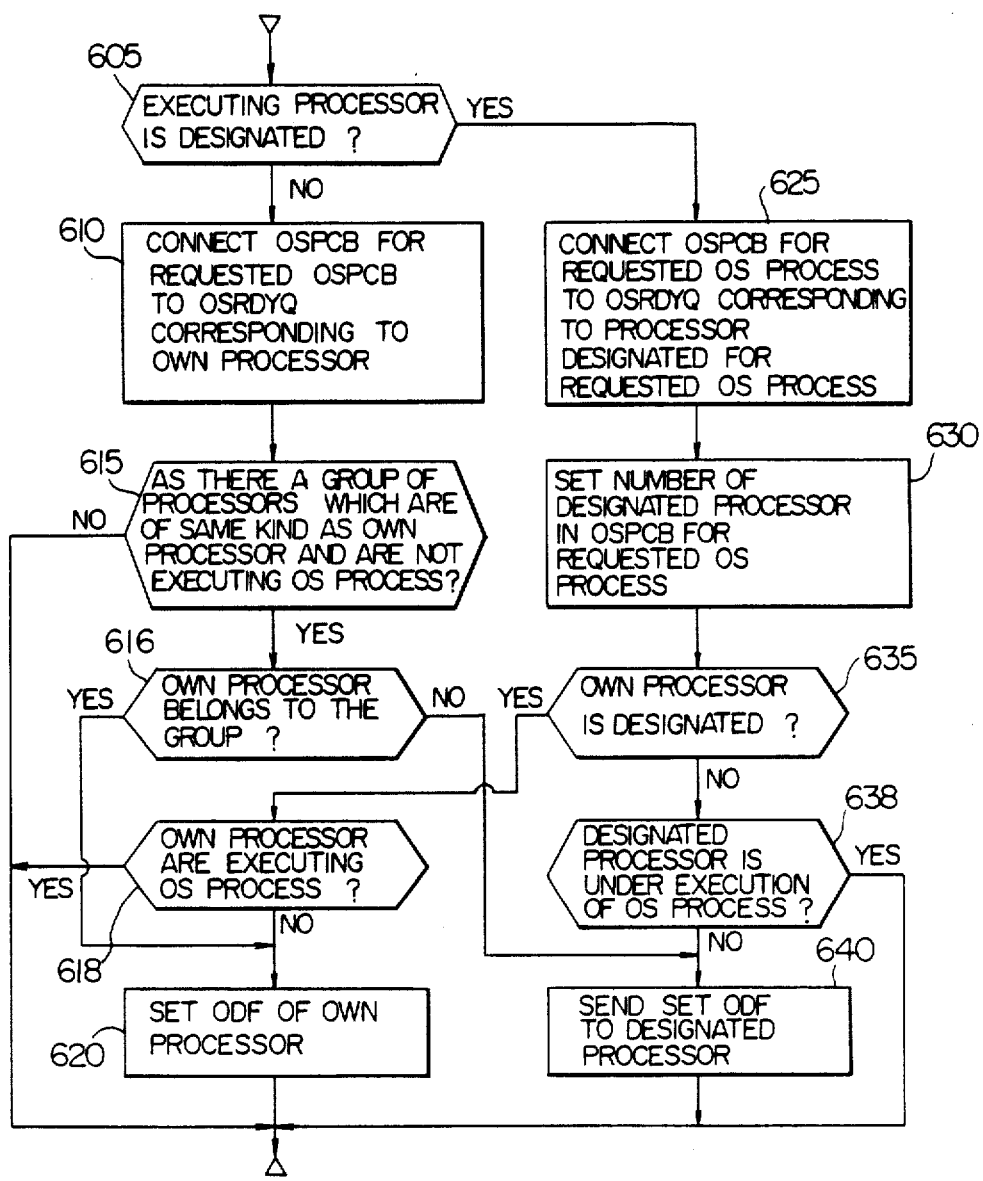
FIG. 8 shows a flow chart illustrating the processing of an OS process execution request instruction (OSQUE).

FIG. 8 shows a flow chart for processing OSDISP 35.

The ODF 20 is reset by a signal ODFRST from the decoder 26 (800). One OSRDYQ corresponding to the kind of the processor is selected from the ready queue pointer group 420 to check the pointer value of the OSRDYQ (805). If the pointer value is zero, there is no OS process in a ready state and the program execution is jumped to the execution of the next machine instruction for processing IFETCH.

If the pointer value is not 0, OSPCB 440 indicated by this pointer value is searched and read out from the main storage 100. A value of PRCN 515 within the OSPCB 440 is checked. If this value is not 0 and the processor number of the own processor is not designated, a value of the pointer (PNT) 500 of the OSPCB 440 is checked. If this value has all 0's, the program jumps to IFETCH. If this value is not 0, the OSPCB 400 indicated by the pointer (PNT) 500 is searched, and it is checked whether or not the value of PRCN 515 within OSPCB 440 corresponds to the number of the processor other than the own processor.

In this way, the OS process execution ready queue is progressively searched in the order from high to low priority levels (step 815). When the value of PRCN 515 is first 0 (the executing processor is not designated) or when OSPCB 440 of the own processor number (the own processor is designated as the executing processor) is detected, that is to say, the OS process with the highest priority level of those ready-state OS processes to be executed by the own processor, is detected, the processing step shifts to a step 820.

A value of the pointer in which the address of the detected OSPCB 440 is changed to a value of the pointer (PNT) 500 of the OSPCB 440 and the OSPCB 440 is taken off from the ready queue. The address of the OSPCB 440 is set in OSEXC corresponding to the own processor (step 820). Preparation for the execution of that OS process is performed (step 825). For example, a run-state flag is set in STUS 510 of the OSPCB 440 and the top address of the OS process in IA 526 of the OSPCB 440 is set in a program counter (not shown). Then, the OS process corresponding to the OSPCB 440 is executed.

(4) Exit processing of OS process

Figure 11:
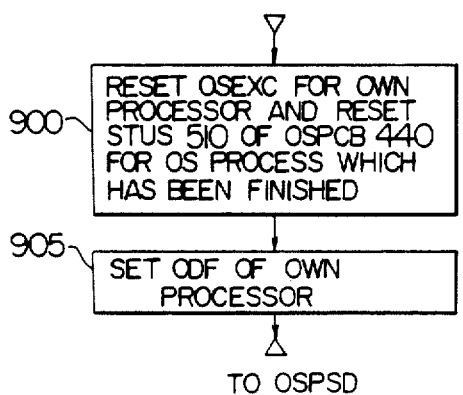
FIG. 11 illustrates a flow chart illustrating an OS process execution termination process (OSEXC).
Figure 10:
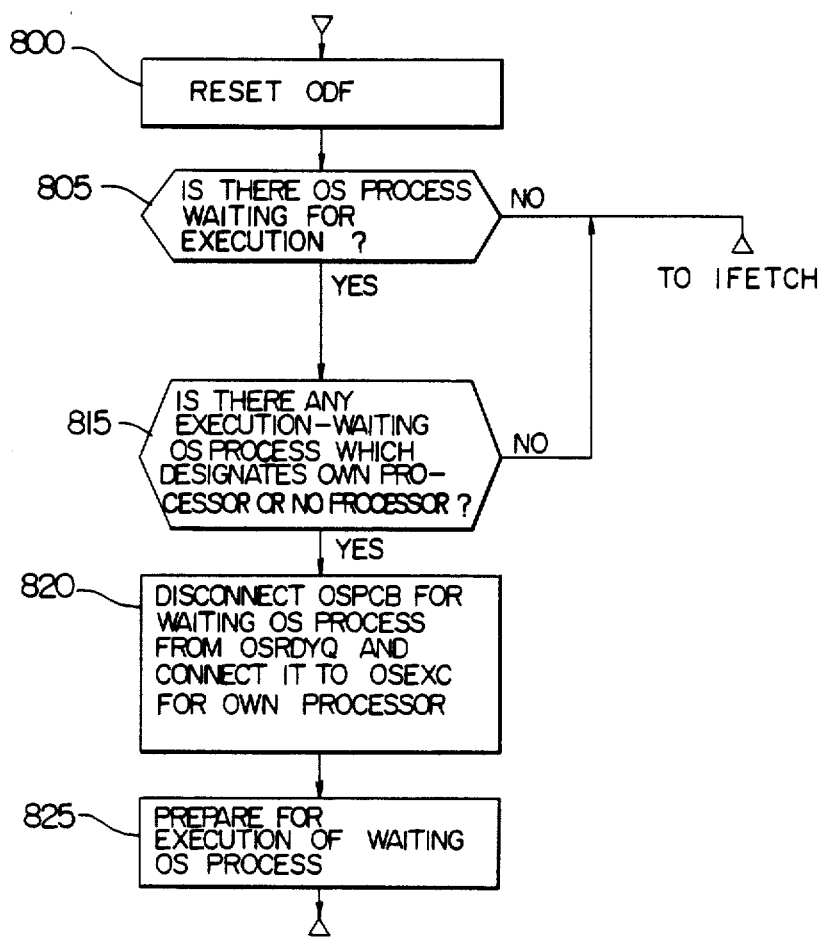
FIG. 10 illustrates a flow chart illustrating an OS process dispatch processing (OSDISP).

Following the exit processing of the OS process, OSEXIT 37 is performed. The processing flow of OSEXIT is illustrated in FIG. 11.

After the processor completes the execution of the OS process, OSEXC corresponding to the processor is cleared to zero, to take off OSPCB 440 corresponding to the OS process from the OSEXC. Then, STUS 510 of OSPCB 440 is reset (step 900).

Then, the ODF 335 is set by a signal ODFSET derived from the decoder 26 (step 905) and the program jumps for the execution of IFETCH.

Through the control as above mentioned, each processor can process an interrupt request, if it is present, prior to the OS process under execution or the user's program under execution. If an OS process execution request is generated during the course of the execution of the user's program, the processor interrupts the execution of the user's program to successively process the requested OS program in the order from high to low priority levels. If the OS process execution request is not present, it can continuously execute the user's program under execution. When executing the OS process, it can continue the execution of the OS process.

The above-mentioned processing is the fundamental operation of each processor.

According to the present invention, when the OS process execution request is generated from a single processor, any other of the processors ready for execution of the OS process can execute the OS process. Accordingly, the following useful effects are attained.

(a) The OS PROCESS generated upon the processing request by executing one user's program can concurrently be processed by a plurality of processors. This feature speeds up the execution of the OS process.

Figure 12:
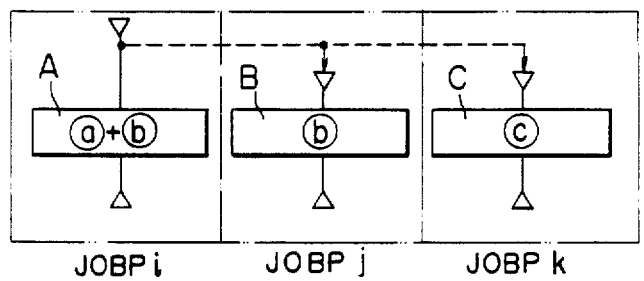
FIG. 12 illustrates a concurrent processing state of the OS process for the exit processing of the user's program according to the present invention.

For example, in case that the OS process for exit-processing the user's program A shown in FIG. 1, which is being executed by the first JOBP, the OS process A corresponding to the steps ⓐ and ⓑ, a first instruction OSQUE for designating JOBPi, an OS process B corresponding to the step ⓑ, a second instruction OSQUE for designating JOBPj, an OS process C corresponding to the step ⓒ, and a third instruction OSQUE for designating JOBPk are performed in the user's program, as shown in FIG. 12. As a result, these three OS processes are concurrently executed by three JOBPs, respectively. Thus, the exit processing of the user's program A can be executed without waiting for the end of execution of the OS processes B and C, resulting in speed-up of the processing.

(b) When a single processor executes an OSQUE instruction in the user's program under execution, the OS process designated by the instruction is executed by another processor designated by the instruction and not by the original processor. This feature speeds up the execution of the user's program.

Figure 13:
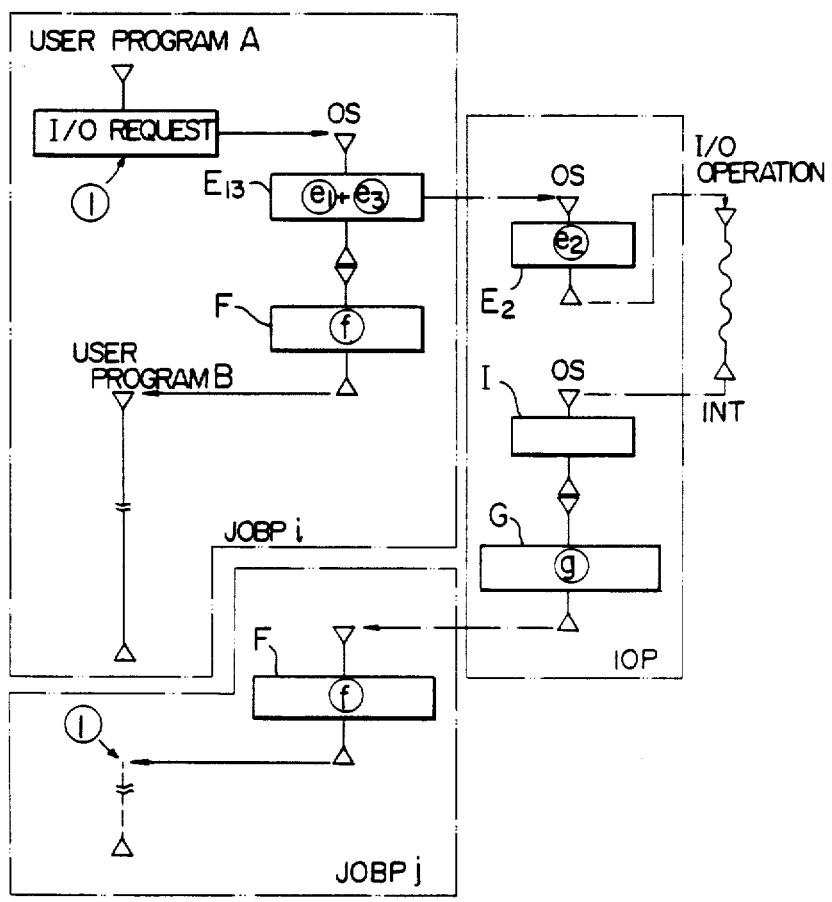
FIG. 13 shows a concurrent execution state of the OS process for processing an input/output request according to the present invention.

For example, the input/output processing shown in FIG. 2 is executed as shown in FIG. 13.

Assume now that in JOBPi, an input/output request is generated during the course of execution of the user's program A. The I/O request is given by a fifth OS process E13 as the combination of the processing step ⓔ₁ and ⓔ₃ shown in FIG. 2, and a fifth instruction OSQUE for designating JOBPi. An OS process E2 corresponding to the step ⓔ₂ in FIG. 2 and a sixth instruction OSQUE for designating IOP are provided at the end portion of the processing step ⓔ₁ in FIG. 2 in the fifth OS process. As a result, the OS process can be executed concurrently with the OS process E13. An OS process F corresponding to the processing step ⓕ in FIG. 2 and a 7th instruction OSQUE for designating JOBPi are provided at the end portion of the OS process E13. Accordingly, the OS process F can be executed without waiting for the end of executing the OS process E2. After the execution of the OS process is finished, the user's program B can be executed. The I/O device is activatd by executing the OS process E2 in IOP, and following its operation IF 18 in IOP is set by the termination interrupt INT. As a result, IOP executes a microprogram INTP 33 and through the execution of the program, a machine program for analyzing the cause of the interruption is executed. An OS process G corresponding to the step ⓖ in FIG. 2 and an eighth instruction OSQUE for designating IOP are provided in the machine program. By the eighth instruction, the OS process G is executed in IOP. Accordingly, JOBPi does not need to execute the OS process G. An OS process F and a ninth instruction OSQUE for designating JOBPi are provided in the OS process G. Therefore, the OS process is executed by JOBPj to execute again the user's program A. Thus, the re-execution of the user's program A can be made by JOBPj different from the original JOBPi. Accordingly, the execution of the user's program B following the interruption of the user's program A is never interrupted as the result of the re-execution of the user's program A.

In this way, the execution of the user's program can be speeded up.

In the present embodiment, the OS process dispatch request flag register is provided for each processor. Whether a request for execution of the OS process is present or not can be judged by merely checking the contents of the register 335 and without searching the main storage 100 through the high speed bus 120.

As seen from the foregoing description, the present invention can speed up the execution of the user's program and the execution of the OS process.

I claim:

1. A method of controlling the execution of a control program known as an operating system for controlling the execution of user's programs in a multi-processor system having a plurality of processors and a memory for storing said control program and said user's programs to be executed by each of said processors, said control program and said user's programs including operating system process execution instructions for initiating operating system control, said memory being connected to said plurality of processors for use in common therewith, said control program being divided into a plurality of subprograms which are concurrently executable to perform respective operating system processes and said memory further storing supervising data including status data prepared for each of said operating system processes, said method comprising:

a first step in which, when a given operating system process execution instruction contained in said user's programs or said control program is executed in any of said processors, the status data in said memory corresponding to the operating system process designated by said operating system process execution instruction is changed from wait-state data to ready-state data;

a second step in which, when any one of said processors is executing one of said user's programs, such processor intermittently interrupts the execution of the user's program to read out from said memory said status data and to detect the presence of the ready-state data relating to any operating system process;

a third step in which when said ready-state data relating to an operating state process is present and detected, any of said processors detecting said ready-state data executes the ready-state operating system process relating thereto, while any of said processors which detect no ready-state data resumes executing the interrupted user's program; and a fourth step in which, when the execution of a ready-state operating system process is completed by a processor, that processor executing said ready-state operating system process again reads out from said memory said status data to detect the presence of other ready-state data relating to another ready-state operating system process.

2. The execution control method according to claim 1, wherein said first step further includes a step of reading out from said memory said status data for detecting one processor which is not executing an operating system process on the basis of executing state supervising data, for indicating whether or not said processors are executing an operating system process, said executing state supervising data being stored in said memory for each of said processors, setting a flag for indicating the presence of a request for executing an operating system process in a detected processor which is not executing an operating system process, and said second step of interrupting the execution of the user's program for detection of the presence of said ready-state data in said memory is performed in a processor when said flag of that processor which is executing one of said user's programs is set.

3. The execution control method according to claim 2, further comprising the steps of:

storing in said memory a wait-state supervising table of having therein a processor assigned to executing each of said operating system processes, reading out said processor number from wait-state supervising table corresponding to said operating system processes designated by said operating system process execution instruction when said operating system process execution instruction is executed, and detecting a coincidence between the processor number of said detected processor which is not executing an operating system process and said process number read out from said wait-state supervising table and setting said flag indicating a request for executing an operating system process in said detected processor when said coincidence is detected.

4. The execution control method according to claim 3, wherein said coincidence detecting step detects the coincidence between the kinds of said processors as designated by said read out processor number and the number of said processor not executing said operating system process.

5. The execution control method according to any one of claims 4 and 3, wherein said ready-state data detecting step includes a step of reading out from said memory a processor number corresponding to a processor assigned to an operating system process relating to detected ready-state data, and a step of detecting a coincidence between said read out processor number with the number of said processor for executing said ready-state operating system process detecting step, and wherein said executing step executes said detected ready-state operating system process only when said coincidence is detected.

6. The execution control method according to claim 5, wherein said coincidence detecting step in said ready-state operating system process detection detects a coincidence between the kinds of the processor designated by the processor number for said read out ready-state data with the processor number for detecting said ready-state operating system process.

* * * * *